US008240081B2

(12) United States Patent
Cuellar Bernal

(10) Patent No.: US 8,240,081 B2
(45) Date of Patent: Aug. 14, 2012

(54) PRISM TRAPS FOR FRUIT AND VEGETABLE INSECTS-PESTS

(76) Inventor: Ricardo Osvaldo Cuellar Bernal, Gustavo A. Madero (MX)

( * ) Notice: Subject to any disclaimer, the term of this patent is extended or adjusted under 35 U.S.C. 154(b) by 332 days.

(21) Appl. No.: 12/461,288

(22) Filed: Aug. 6, 2009

(65) Prior Publication Data

US 2010/0242339 A1   Sep. 30, 2010

(30) Foreign Application Priority Data

Mar. 25, 2009   (MX) .................... MX/a/2009/003230

(51) Int. Cl.
*A01M 1/10* (2006.01)
*A01M 1/02* (2006.01)
*A01M 1/14* (2006.01)

(52) U.S. Cl. ............................................ 43/107; 43/114
(58) Field of Classification Search .................... 43/107, 43/114, 122

See application file for complete search history.

(56) References Cited

U.S. PATENT DOCUMENTS

| 862,467 | A | * | 8/1907 | Gardiner | 43/114 |
| 1,071,578 | A | * | 8/1913 | Rese | 43/114 |
| 1,112,064 | A | * | 9/1914 | Gordon | 43/114 |
| 1,118,845 | A | * | 11/1914 | Day | 43/114 |
| 1,521,261 | A | * | 12/1924 | Tschernitschek | 43/114 |
| 2,258,683 | A | * | 10/1941 | Robert Ketterer | 43/114 |
| 3,685,199 | A | * | 8/1972 | Bradshaw | 43/114 |
| 3,729,858 | A | * | 5/1973 | Bradshaw | 43/114 |
| 3,755,958 | A | * | 9/1973 | Bradshaw | 43/114 |
| 3,863,384 | A | * | 2/1975 | Weatherston et al. | 43/114 |
| 3,913,259 | A | * | 10/1975 | Nishimura et al. | 43/114 |
| 4,044,495 | A | * | 8/1977 | Nishimura et al. | 43/114 |
| 4,133,137 | A | * | 1/1979 | van Adelsberg | 43/114 |
| 4,156,321 | A | * | 5/1979 | Capizzi et al. | 43/114 |
| 4,217,722 | A | * | 8/1980 | McMullen | 43/114 |
| 4,244,134 | A | * | 1/1981 | Otterson | 43/114 |
| 4,349,981 | A | * | 9/1982 | Sherman | 43/114 |
| 4,425,731 | A | * | 1/1984 | Orlando | 43/114 |
| 4,442,624 | A | * | 4/1984 | Browne | 43/107 |
| 4,867,731 | A | * | 9/1989 | Willard et al. | 43/114 |
| 4,961,282 | A | * | 10/1990 | Hoppe | 43/114 |
| 5,303,501 | A | * | 4/1994 | Seemann | 43/114 |
| 5,384,981 | A | * | 1/1995 | Cohen | 43/114 |
| 5,396,729 | A | * | 3/1995 | Vejvoda | 43/114 |
| 5,608,988 | A | * | 3/1997 | Dowling et al. | 43/114 |
| 5,685,109 | A | * | 11/1997 | Rimback | 43/107 |
| 5,815,981 | A | * | 10/1998 | Dowling et al. | 43/114 |
| 5,907,923 | A | * | 6/1999 | Heath et al. | 43/107 |
| 6,082,042 | A | * | 7/2000 | Issitt | 43/131 |
| 6,202,341 | B1 | * | 3/2001 | Bernard | 43/122 |
| 6,493,988 | B1 | * | 12/2002 | Johnson | 43/131 |
| 6,516,558 | B1 | * | 2/2003 | Lingren et al. | 43/107 |
| 6,874,274 | B2 | * | 4/2005 | Townsend | 43/107 |

(Continued)

FOREIGN PATENT DOCUMENTS

EP   26419 A1 * 4/1981

(Continued)

*Primary Examiner* — Darren W Ark
(74) *Attorney, Agent, or Firm* — Nixon & Vanderhye P.C.

(57) ABSTRACT

A trap for collecting insects and pests is formed in a triangular prism shape. The triangular prism shaped trap is formed from a rectangular plate that is divided into three sections, the rectangular plate being bent into the triangular prism shape. A rectangular cavity that protrudes inward into the trap may be formed on one wall. Also, a control card may be mounted on one wall.

11 Claims, 3 Drawing Sheets

U.S. PATENT DOCUMENTS

| | | | |
|---|---|---|---|
| 6,886,292 B2 * | 5/2005 | Studer et al. | 43/114 |
| 7,481,022 B2 * | 1/2009 | Cohen | 43/131 |
| 7,856,753 B2 * | 12/2010 | Fisher | 43/107 |
| 2006/0021275 A1 * | 2/2006 | Howse | 43/107 |
| 2006/0283075 A1 * | 12/2006 | Feldhege et al. | 43/114 |
| 2006/0283076 A1 * | 12/2006 | Chambers et al. | 43/114 |
| 2007/0094915 A1 * | 5/2007 | Plato et al. | 43/114 |
| 2008/0086932 A1 * | 4/2008 | Cook et al. | 43/114 |
| 2009/0000180 A1 * | 1/2009 | Palencia-Adrubau et al. | 43/131 |
| 2009/0293342 A1 * | 12/2009 | Winkler | 43/114 |
| 2010/0154290 A1 * | 6/2010 | Fisher | 43/114 |

FOREIGN PATENT DOCUMENTS

| | | | |
|---|---|---|---|
| EP | 2210488 A2 * | 7/2010 | |
| FR | 2620304 A3 * | 3/1989 | |
| GB | 2148686 A * | 6/1985 | |
| GB | 2180135 A * | 3/1987 | |
| JP | 01063329 A * | 3/1989 | |
| JP | 02086725 A * | 3/1990 | |
| JP | 08047361 A * | 2/1996 | |
| JP | 09299014 A * | 11/1997 | |
| JP | 11000092 A * | 1/1999 | |
| JP | 2000014304 A * | 1/2000 | |
| JP | 2001069894 A * | 3/2001 | |
| JP | 2001321058 A * | 11/2001 | |
| JP | 2001352889 A * | 12/2001 | |
| JP | 2002125564 A * | 5/2002 | |
| JP | 2002142642 A * | 5/2002 | |
| JP | 2002205904 A * | 7/2002 | |
| JP | 2003339293 A * | 12/2003 | |
| JP | 2006311802 A * | 11/2006 | |
| JP | 2007097408 A * | 4/2007 | |
| JP | 2007195507 A * | 8/2007 | |
| JP | 2008161090 A * | 7/2008 | |
| JP | 2010063450 A * | 3/2010 | |
| WO | WO 9848619 A1 * | 11/1998 | |
| WO | WO 9960848 A1 * | 12/1999 | |
| WO | WO 2004098279 A2 * | 11/2004 | |

* cited by examiner

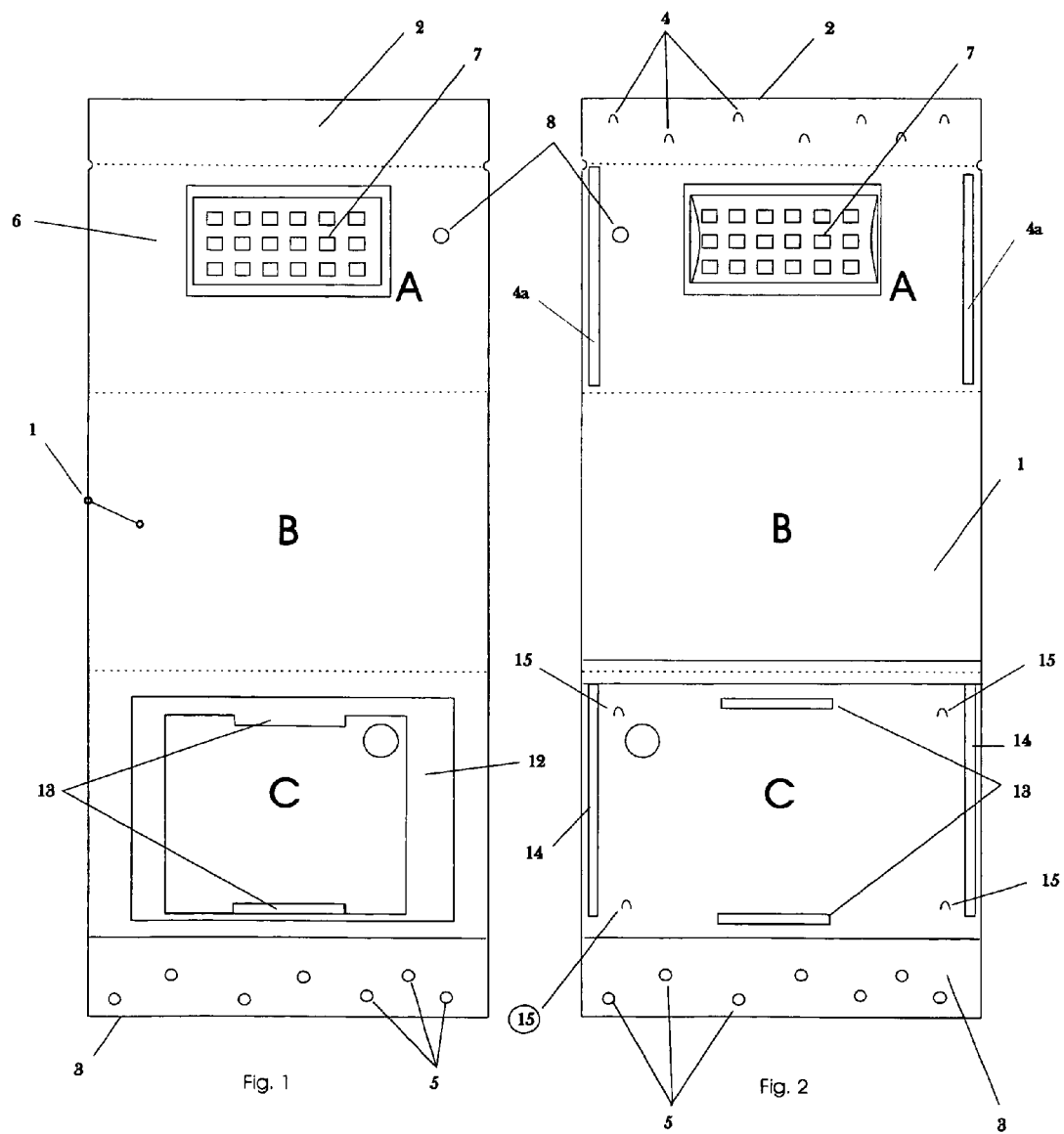

US 8,240,081 B2

PRISM TRAPS FOR FRUIT AND VEGETABLE INSECTS-PESTS

This application claims priority to Mexican Application No. MX/A/2009/003230 filed Mar. 25, 2009, the entire contents of which is hereby incorporated herein by reference.

FIELD OF THE INVENTION

This invention generically applies to the field of programs for the detection, control and eradication of fruit and vegetable insects-pests, and in the case at hand, one of the preferred modalities refers to the detection, control and eradication of fruit flies of economic importance, by the comprehensive Management of the devastating pest of the Mediterranean fruit fly, and the most modern and ecological control method, being the insect sterilization technique, where, by the massive release of sterile male insects of the target species, they interrupt the reproductive cycle of the pests.

The timely detection of the pests, the confinement of the infestation, the verification of the control and the eradication, is based on the information obtained by the best traps and baiting.

Hence, the purpose of the invention of the best prisms for fruit and vegetable insects-pests, contributing towards the protection and conservation of the environment with respect to the national control of pests that harm these vital foods in the life of man.

BACKGROUND OF THE INVENTION

It is well known that for many-years distinct techniques have been used around the word, and millions of dollars have been spent in order to protect the production and exportation of fruits and vegetables, by means of using distinct solid, liquid or gas chemical products, and a variety of utensils have been designed in order to place selected chemical agents therein for the containment thereof, and that generically they are know as traps. Such traps, made in distinct shapes and with distinct materials, have been modernized over time.

Currently, the most commonly used detection method to determine the presence or absence of the Mediterranean fruit fly and other adult fruit flies in a determined area, is the method by means of a specific trap. This method consists of the establishment and maintenance in operation of an effective and strategically placed network of traps, subject to periodic revision according to the importance of the area.

For a long time, the typical method among such techniques has been habitually conserved, being the use of traps with chemical products inoffensive to humans but effective against the distinct species that attack fruits and vegetables. It is true that at first they may have been products of easy detection and consumption, and that with time the systems underwent many transformations in their forms and with the raw materials they used, thus taking on different forms to make them more effective.

When first implemented, the first techniques were perhaps somewhat effective against pests, but with time, said species have adapted themselves to the distinct chemical products used to control them and they have become more resistant to such compounds, in that their organisms have evolved and changed, becoming necessary, in order to combat them, to modify the form of the traps as well as the used chemical products, but without such changes affecting the quality and nature of the fruits and vegetables, and with the use thereof, it is intended to completely minimize their inconveniences in a rapid and effective manner, while achieving a satisfactory performance in the undertaking of their eradication.

Although in the study of this field, multiple traps have been used in the past, the most widely used traps for many years in programs of detection, capture, prevention, ecological control and for the monitoring of populations of sterile flies in the areas submitted to programs of massive release, are of two types: Artisan, such as the EUGOTCC-2000 and the JD-EUGO-97 made using disposable fruit juice cartons and pasteurized milk cartons, or everyday disposable 2-liter plastic soda bottles or similar containers.

But there are also other types of so-called traditional or conventional traps, among with are the following:

The McPhail trap, which is a pear-shaped, transparent, invaginated, glass container, consisting of a cork stopper that completely seals the upper part and which has a wire hook to hang it on tree branches. This trap uses liquid food baits with hydrolyzed proteins or yeast with borax. This trap not only traps fruit flies but also other flies and it required much labor for servicing and topping up, and therefore the number of traps attended is limited. These traps should be checked every 8-15 days in order to know how many flies have been captured; if the number of captured flies is high, the control should be completed with the aspersion of toxic bait.

The Miltilure trap is a new version of the Mcpail trap, consisting of a two-piece, cylinder-shaped plastic container, which is separated in order to effectuate servicing and baiting. The transparent upper part contrasts with the yellow base, increasing the attraction of flies, but it uses synthetic dry bait, therefore being more selective and powerful; it is cleaner and requires less labor, and it is therefore cheaper.

The open-bottomed Dry trap with synthetic dry bait consists of a open-bottomed green cardboard or plastic cylinder covered with wax, with transparent plastic in the upper part and holes in the cylinder, and it uses a sticky insert. This trap is used in areas where glass traps are unable to be used and it is capable of trapping males with its bait.

The yellow Panel trap is made from rectangular cardboard covered by a thin layer of glue and it uses pheromones as bait, specifically for males, and it uses a hook for hanging. It is easy to handle and needs little labor, but its defect is that the glue destroys the flies and it requires special delivery transportation and should not be used in areas subject to massive release of sterile flies, and it also traps other insects, some of which are beneficial insects.

The Cook and Cunningham trap consists of 3 detachable panels, separated from each other. The 2 external panels are cardboard and they are covered with glue on the outside. The center panel is used as a trimedlure bait. The 3 panels provide a greater adhesive surface for the capture of flies, which are fixed by clips and it is hung with a hook, and the trap is used for a massive, economic capture of the Mediterranean fly, or in order to monitor and detect very low incursions of flies.

The Champ trap consists of a yellow, sticky, two-dimensional, rectangular panel, designed for use with polymeric bait. The face of the panel is perforated for a high release of the bait, and the outer surface is covered with glue and it also uses synthetic bait. This trap is the same as the yellow panel with respect to sensitivity, and it is recommended for delimiting infestations in fruit fly eradication programs, and it has been used in California, baited with ammonium carbonate for the olive fly.

The Tephri trap is similar in design to the Mcphil trap, and is widely used in Europe; it is cylinder-shaped with a yellow base and a removable transparent top, so that it can be cleaned, with holes in the upper part and an opening in the bottom. The top has a platform inside on which the baits are placed, and such baits may be food, pheromone or similar baits, as well as hydrolyzed or liquid protein bait in the form of polymeric plastic, but it is always necessary to add cottonwool impregnated with insecticide in order to prevent the escape of the captured insects.

The Steiner trap consists of a transparent horizontal cylinder with two large entrances at the ends, with a hook on the upper part for hanging. This trap uses specific pheromones for the capture of males and the bait is placed in the center by means of cottonwool impregnated with a mixture of pheromone or insecticide, or a polymeric tablet of controlled release is placed in a plastic basket suspended from the roof of the trap.

There are also much more sophisticated types of traps, but they are much more expensive, such as cone-shaped traps that function with electric current with wired or wireless connections, and they are used for the capture of nocturnal insect pests, and they are only turned on at night. Given there high expense, these traps are not described herein.

The objective of this invention is obviously to present a type of trap that is different from those known up to now, while taking into account the fact that it is cheap, easy to transport, handle and deal with, thus permitting the effectuation of a greater number of traps than in the case of other commercial traps. This trap innovation is revised between 7 and 14 days for the detection of fruit fly specimens, and it consists of a triangular prism with a waxed cardboard insert, covered with a layer of sticky material that traps the flies, and a plastic basket that holds a polymer tablet with bait where the bait is placed in both sides, and such bait may be the same or different, and the trap is hung with a wire hook placed in the upper part of the body of the trap.

This trap, invented by me, for the capture of Mediterranean fruit flies or other fruit flies, has modified the design and interior of the trap, which, when assembled, makes it comprehensive but not bulky, having modified the comparison with the distinct traps on the market, while proposing a revolutionary model with a geometric figure shaped in the form of a triangle, fully assembled in one sole piece, using innovative materials, both for the bait as well as the glue, and incorporating other devices, making it versatile and long-lasting, thus creating an innovative model, incorporating several particularities never before used, and which underline the advantages thereof, given that they have been thought up in such a manner that as a whole, they are harmonious and completely different from the traditional manufactured traps.

It is important to take into account that the specific value of my invention is found in the interaction of the form and constitution of my trap for pest insects, being made of a thermoplastic, but which may easily be folded in order to form a triangle, and which presents a rim with projections so that, upon folding, it coincides with perforations on the opposite side, thus creating a firm structure with a grate for the bait, with a plate of a phosphorescent material covered with a stick material and a bait placed fully inside a basket of the trap. The plate remains illuminated for a period of six hours in the dark or in dim light on cloudy days, which makes it more effective in the capture of insect pests, which in itself is an innovation in the corresponding art, thus making this invention patentable.

OBJECTIVES OF THE INVENTION

The trap I have invented in the shape of a prism for the capture of fruit and vegetable insects-pests, especially the Mediterranean fruit fly and other fruit flies of economic significance, gives the user extensive versatility for the handling, transport and capture of the insects, as well as for the gathering of data by means of the integration of a type of card-recorder inside, with a series of compartments hidden from outside view. Another notable advantage is its lightness in weight without this resulting in its substantial deformation over time, which enables the user to gather all the records inside the trap for more time and with greater ease, while being able to proportionally distribute all the components of capture within same.

One significant characteristic of my trap for the capture of the fruit fly of economic importance, is that by virtue of the separation of compartments upon assembly, in a triangular position, it becomes very easy for the user in the field to handle and attend a greater number of traps, which, given the fact that they are long-lasting, only require the replacement of the phosphorescent insert with sticky material, the localization of the exact place where the flies are concentrated, and thus resulting in a much more effective and strategically localized trapping system, but, logically, without ceasing to perform periodic revisions.

Another much more important characteristic of the trap I have invented, upon comparing it with the existing traps on the market, is its durability. In effect, there do indeed exist much cheaper traps, but less durable, which, in the long run means that my trap is more economic to use for a much longer time, without loosing the validity and efficiency thereof.

The experiences of prior art have briefly been pointed out in order to clearly determine the scope of this invention, which, as established at the beginning of this document, refers to a complete innovative trap, which is totally practical, and, over time, much more economic.

BRIEF DESCRIPTION OF THE DRAWINGS

The characteristic details of the triangular trap I have invented for the capture of fruit and vegetable insects-pests, especially the Mediterranean fruit fly and other fruit flies, are clearly shown in the following description and accompanying drawings, consisting of a rectangular plastic plate to which distinct additions have been incorporated, and where:

FIG. 1 is a top view of the trap invented by me, in an open frontal position, showing all the components and projections in the upper and lower parts, as well as the diverse perforations therein, while showing two horizontal sections for the possible folding thereof, and an inner rim with a series of perforations.

FIG. 2 is also a top view of the rear part of the trap shown in FIG. 1, in open position showing all the corresponding components and projections, where an upper rim is noted with a series of projections followed by a projection in the shape of a small basket, and two parallel-spaced, longitudinal obturations and a series of small projections with two vertical projections on both sides, and lastly, an inner rim with a series of circular perforations.

DETAILED DESCRIPTION OF THE INVENTION

Figure 3:
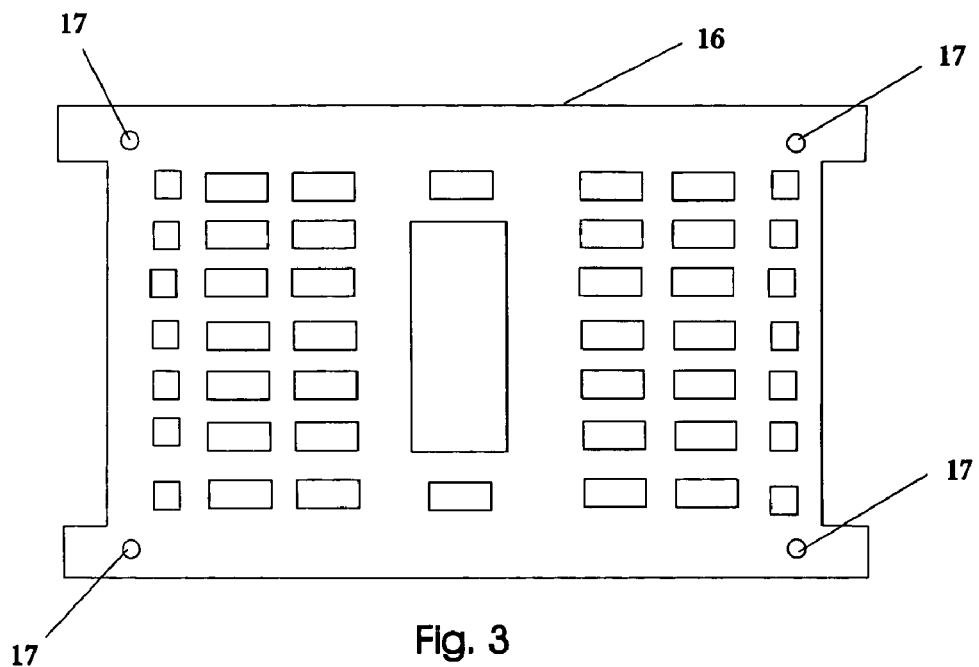
FIG. 3 is a slightly elongated, thin, rectangular, plastic grate for the placement of a sold bait or a phosphorescent sticky material with a duration of 6 hours, which attracts the insects or a plate with a sticky material.
Figure 4:
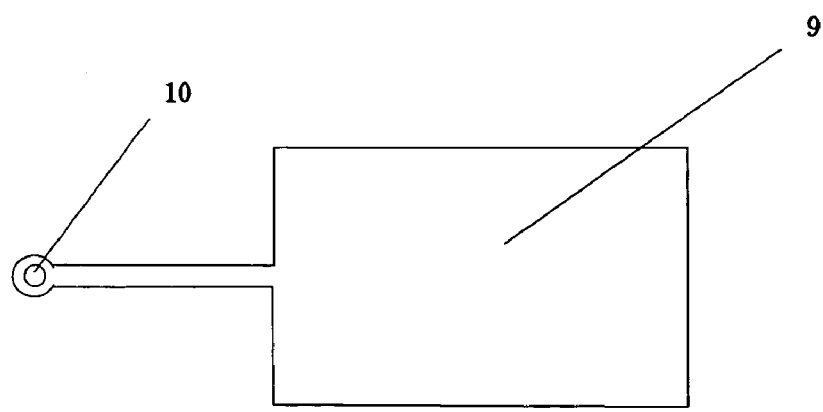
FIG. 4 shows the form of a plastic, rectangular pallet, serving to block the opening where the trap bait is placed.
Figure 5:
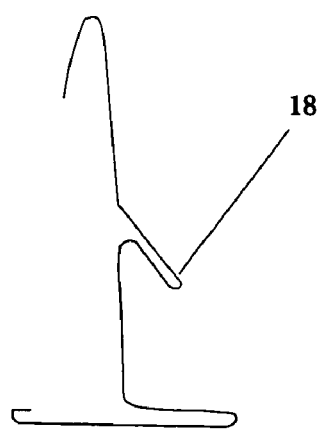
FIG. 5 shows a metal hook to hang the trap in any selected site.
Figure 6:
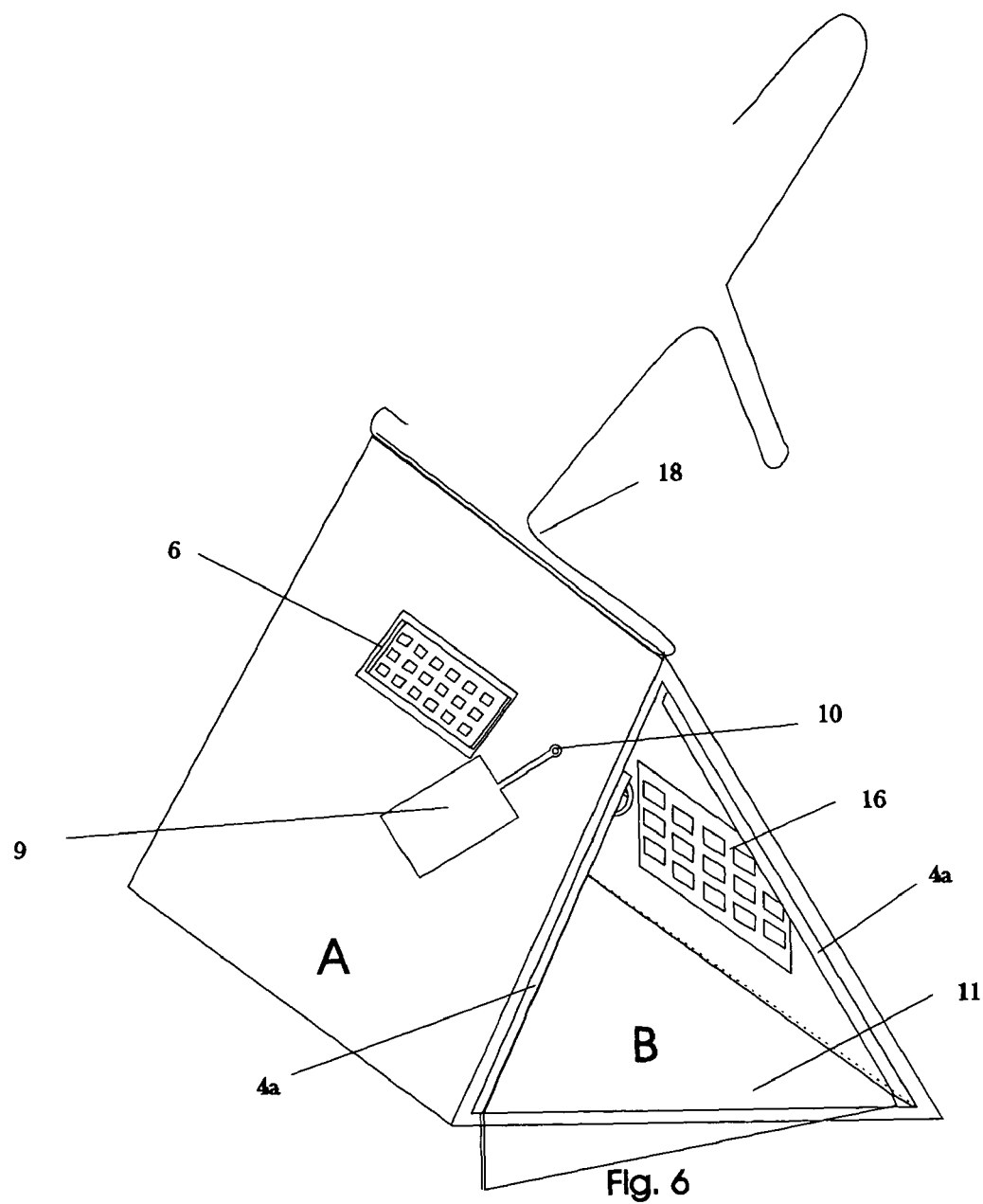
FIG. 6 shows the triangular trap for flying insects, especially fruit flies, in its assembled position and with all the components thereof, ready for use in the field.
Figure 7:
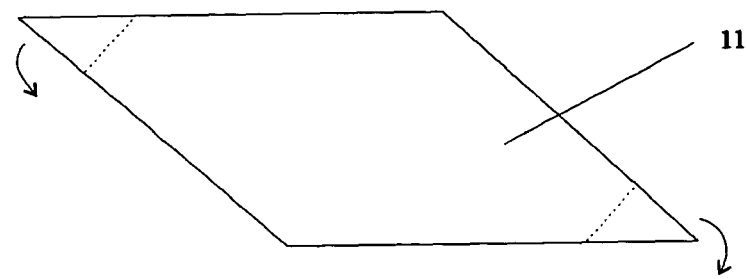
FIG. 7 shows the rhomboid shape of a cardboard insert or plate for identification and monitoring which is phosphorescent, and which is placed in the lower base of the trap.

In a preferred modality, but by no means limitative, and based on the figures shown hereinabove, the triangular prism-shaped trap invented by me for trapping fruit and vegetable insects-pests, principally the Mediterranean fruit fly and other fruit flies, especially the Mediterranean fruit fly and other fruit flies, is essentially made up of an elongated, rectangular thin plastic plate (1) with 3 sections, an upper section (A), a middle section (B), and a lower section (C), with all three sections being rectangular and of similar dimensions.

The upper Section (A) presents an upper rim (2), while the lower section (C) also shows an extreme rim (3). The front part of the upper rim (2) has a smooth surface, with a series of strategically placed low projections (4) in the lower part thereof. The extreme lower rim (3), in turn, presents a series of strategically distributed circular perforations (5) in accordance with the number and placement of the projections (4) of the upper rim (2) and which serve, upon assembly of the trap, as securing means in order to this form the geometric figure of a triangular prism similar to a hollow pyramid. Furthermore, the rear part of the upper section (A) presents, almost on both edges, two longitudinal projections (4a), spaced in parallel, which duly serve to prevent the information inside the trap from sliding out and becoming lost.

Furthermore, the rear part of the upper section (A) presents a rectangular cavity (6) that extends inwards to form, in the lower part of the upper section (A), a sort of elongated semi-cylindrical grate with symmetrical groves (7). Furthermore, the upper section (A) presents an orifice (8) of reduced dimensions placed to one side of the rectangular cavity (8). Such orifice (8) serves to place therein, a pallet-shaped piece of plastic (9), pivotally fixed by the thin portion (10) by any conventional securing means. The rectangular part of the pallet-shaped piece (10) practically presents the same dimensions of the rectangular cavity (6), which serves to completely block said cavity when the type of selected bait is placed inside.

The middle section (B) presents no modification and it is a perfectly smooth surface both in its front portion as well as its rear portion, and where the front portion serves as a base when the prism-shaped trap is assembled, with the rear portion of the middle section (B) remaining completely flat in order to place inside a sticky card for identification and capture (11), which has practically the same dimensions as the middle section (B) so that the card (11) remains fixed in place and is unable to slide out when the trap is handled.

The lower section (C) of the prism-shaped trap presents interesting characteristics; firstly, an elongated rectangular projection (12) is located in the front part thereof, which occupies almost the entire surface of said lower section (C) with two protruding slots (13) that serve to securely place between them, a trap localization and inspection control card, being visibly protected by a transparent plastic plate (not shown), to protect it from the weather.

Secondly, at the rear of the lower section (C), are two vertical projections, spaced in parallel (14) on both sides thereof, and diametrically spaced between them are 4 projections (15) placed almost at the corners of the rear part of the lower section (C). Such small projections (15) shall, when the trap is assembled, serve for the insertion of a rectangular plastic grate (16), which, in the corners thereof, present 4 perforations (17), which are attached to the 4 projections (15) thus temporarily securing the grate (16). Inside this grate (16) shall be placed a bait plate or lamina (not shown) when the trap is assembled for the definitive use thereof, and such bait plate or lamina (not shown) may be changed as many times as is necessary.

In order to assemble the trap, the first thing to do is join between the projections (15) of the lower section (C), the rectangular grate (16) and place therein, the chosen textured plate, thus remaining secured inside the trap, after which the actual assembly of the trap is effectuated, simply consisting of first bending inwards the initial rim (2) of the upper section (A), followed by the extreme rim (3) of the lower section (C), and once folded, insert the projections (4) of the initial rim (2) into each of the orifices (5) of the extreme rim (3) of the lower section (C) in order to thus form the geometrical shape of a prism, and with the trap is thus assembled, externally place the distinct components of the trap, such as: the type of bait placed in the opening (7) of the upper section (A) after which it is covered by the pallet (9) in order to prevent the effluxes thereof dispersing outside, concentrating them inside the trap. Then the sticky card (11) is placed inside the base of the trap (11), folding the corners thereof. Then the distinct identification, maintenance and inspection cards are inserted both inside as well as outside the previously assembled trap, preventing them falling out with the aid of the projections (4a), and lastly, a metallic hook (18) is introduced through the fold of the upper part of the trap and it is then hung and ready for use.

It is of the utmost importance to emphasize that although the invention has been shown and described in relation to only one specific modality of my invention, it should be pointed out that certain changes may be made thereto, such as the use or distinct options for closing the trap by means of a clasp or by adhesion by millipore, etc. Multiple changes may also be made to the shape of the trap, placing the components thereof in a place other than the place specified herein, but naturally and logically, all such changes are included within the field of the invention, as established in the following claims.

What is claimed is:

1. A triangular prism-shaped trap for fruit and vegetable insects and pests formed from an elongated rectangular plate that is divided into three sections of similar size, the three sections comprising:
    an upper section comprising:
        a rim which, along one side thereof, includes a plurality of projections, and
        first and second longitudinal projections located adjacent opposite edges of an interior side of the upper section, wherein the first and second longitudinal projections are configured to hold an information card inside the trap;
    a middle section; and
    a lower section having an extreme rim with a plurality of perforations that correspond to the projections on the upper section, wherein the projections on the upper section are insertable into the perforations in the lower section to assemble the elongated rectangular plate into a triangular prism.

2. A triangular prism-shaped trap for fruit and vegetable insects and pests formed from an elongated rectangular plate that is divided into three sections of similar size, the three sections comprising:
    an upper section having a rim which, along one side thereof, includes a plurality of projections;
    a middle section; and
    a lower section comprising:

an extreme rim with a plurality of perforations that correspond to the projections on the upper section, wherein the projections on the upper section are insertable into the perforations in the lower section to assemble the elongated rectangular plate into a triangular prism, and first and second protruding slots formed on upper and lower portions, respectively, of an exterior side of the lower section, the protruding slots being configured to receive and hold an inspection control card.

3. The triangular prism-shaped trap of claim 2, wherein the upper section comprises:

a rectangular cavity that protrudes inward into the trap;

an aperture in the upper section located at one side of the rectangular cavity; and a cover plate having a rectangular portion and a thin elongated portion, the thin elongated portion being coupled to the aperture such that the rectangular portion can cover or expose the rectangular cavity.

4. The rectangular prism-shaped trap of claim 2, wherein interior and exterior sides of the middle portion are substantially smooth.

5. The rectangular prism-shaped trap of claim 2, wherein the lower section further comprises a transparent plate that is mounted on the exterior side of the lower section to cover and protect the location where an inspection control card would be mounted on the first and second protruding slots.

6. The rectangular prism-shaped trap of claim 2, wherein the lower section further comprises left and right vertical projections formed on left and right sides, respectively, of the interior side of the lower section.

7. The rectangular prism-shaped trap of claim 6, wherein the left and right vertical projections are configured to receive a bait plate, and wherein at least one protrusion is formed on the interior side of the lower portion, the at least one protrusion being configured to be inserted into a corresponding perforation on a bait plate when a bait plate is mounted between the left and right vertical projections.

8. The rectangular prism-shaped trap of claim 7, wherein the at least one protrusion comprises four protrusions, each protrusion being located adjacent a corner of the interior side of the lower portion, the four protrusions being configured to be inserted into four corresponding perforations of a bait plate to help affix the bait plate to the interior of the lower portion.

9. A triangular prism-shaped trap for fruit and vegetable insects and pests formed from an elongated rectangular plate that is divided into three sections of similar size, the three sections comprising:

an upper section having a rim which, along one side thereof, includes a plurality of projections;

a middle section; and a lower section comprising:

an extreme rim with a plurality of perforations that correspond to the projections on the upper section, wherein the projections on the upper section are insertable into the perforations in the lower section to assemble the elongated rectangular plate into a triangular prism, and vertical projections located adjacent left and right sides, respectively, of an interior side of the lower section, wherein the vertical projections are configured to receive and hold a bait plate inside the trap.

10. The rectangular prism-shaped trap of claim 9, wherein the lower section further comprises at least one protrusion which is formed on the interior side of the lower portion, the at least one protrusion being configured to be inserted into a corresponding perforation on a bait plate that is mounted between the vertical projections.

11. The rectangular prism-shaped trap of claim 10, wherein the at least one protrusion comprises four protrusions, each protrusion being located adjacent a corner of the interior side of the lower portion, the four protrusions being configured to be inserted into four corresponding perforations of a bait plate to help affix the bait plate to the interior of the lower portion.

\* \* \* \* \*